Patented Jan. 30, 1945

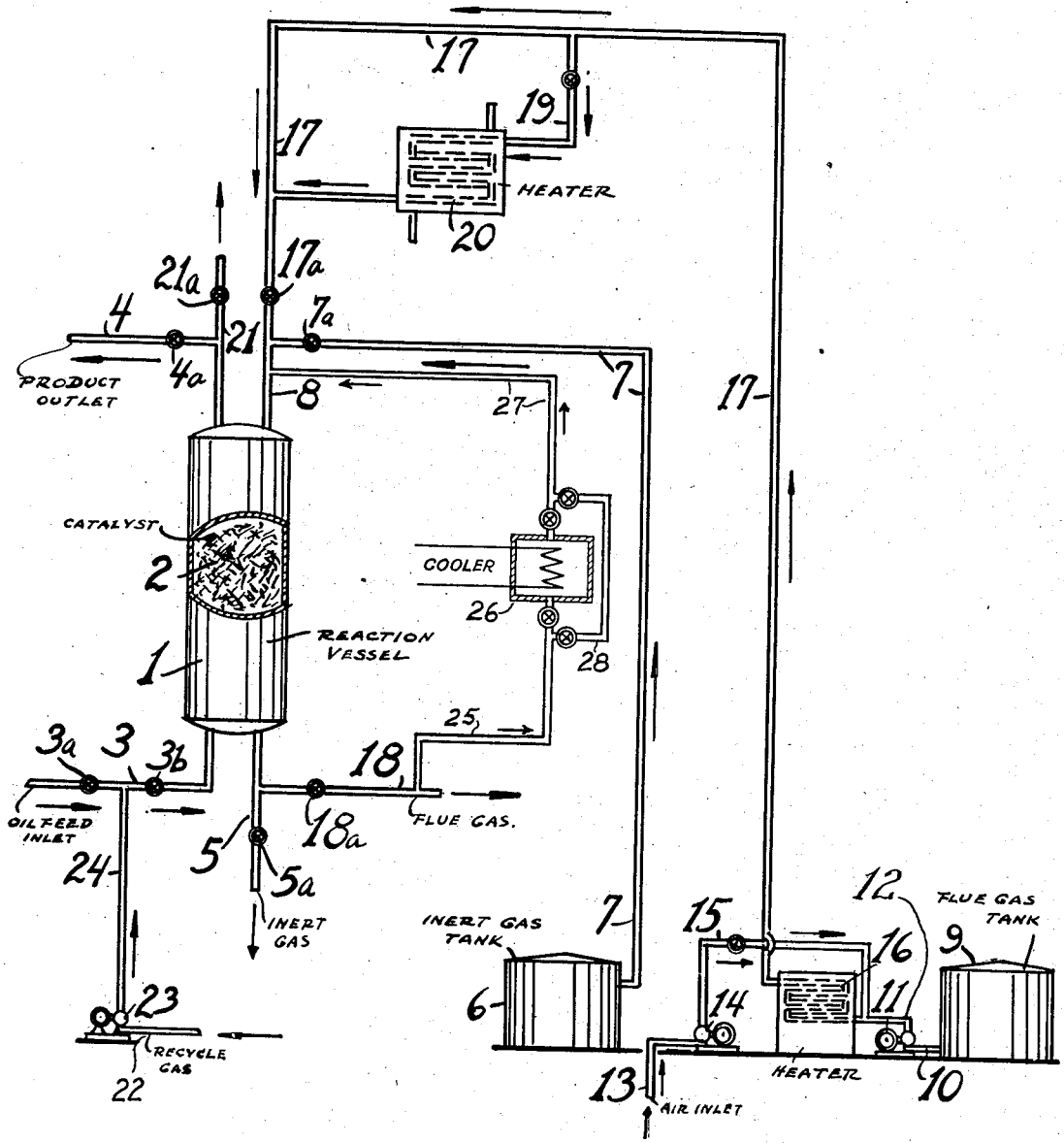

2,368,507

UNITED STATES PATENT OFFICE 2,368,507

REGENERATION OF CATALYSTS

Albert B. Welty, Jr., Mountainside, N. J., assignor to Standard Oil Development Company, a corporation of Delaware Application December 31, 1940, Serial No. 372,481

8 Claims. (Cl. 252—242)

This invention relates to the regeneration of catalysts and is more particularly concerned with an improved method of regenerating catalysts used in catalytic reactions such as catalytic cracking, catalytic reforming, catalytic dehydrogenation, catalytic aromatization and the like.

The catalysts with which the present invention is concerned are those which upon use gradually lose their activity but are nevertheless capable of being regenerated by treatment with air or with hot inert gases containing regulated quantities of air or oxygen at temperatures high enough to cause combustion of the carbonaceous material deposited upon them during the catalytic reaction. The burning of the carbonaceous material in the regeneration of these catalysts is characterized by a flame front, that is to say, the carbonaceous material is not burned off evenly throughout the catalyst mass but burns off first near one end of the catalyst mass and a narrow localized zone of combustion advances gradually through the catalyst mass to the other end.

Many catalysts of this type are known. They consist generally of materials such as aluminum oxide, alumina gels, peptized alumina gels, bauxite, silica-alumina, silica-magnesia, synthetic plural gels of silica and alumina, silica and magnesia, or silica and alumina and magnesia, "Super-Filtrol," and activated or acid-treated clays of the bentonitic or montmorillonitic types, which may be used alone, in various mixtures with each other or in combination with minor proportions of oxides or sulfides of metals of the IV, V, VI and VIII groups of the periodic system such as the oxides or sulfides of vanadium, molybdenum, tungsten, chromium and nickel. The activity of the aluminous and siliceous materials may frequently be increased by treating them with hydrofluoric acid, fluosilicic acid or other fluorine compounds prior to use. Particularly suitable catalysts for catalytic reforming consist of aluminum oxide in any of its various forms together with from 1 to 50% by weight of molybdenum oxide or chromium oxide. Particularly suitable catalysts for catalytic cracking consists of "Super Filtrol," synthetic gels of silica and alumina, or acid-treated bentonitic clays.

Processes of catalytic reforming in which catalysts of the type described are used are applied to the treatment of hydrocarbon oils consisting essentially of hydrocarbons boiling in the gasoline range for the purpose of increasing the octane number of said hydrocarbon oils. The principal reactions which occur are dehydrogenation and aromatization. To a lesser extent other reactions such as desulfurization, polymerization, alkylation and isomerization also occur. The process is ordinarily carried out at temperatures between 850 and 1050° F., under pressures from slightly above atmospheric to 200 or 300 pounds per square inch or more, and at space velocities of 0.3 to 5.0 volumes of liquid oil per volume of reaction space per hour. Frequently it is desirable to conduct the reforming operation in the presence of substantial quantities of added or recirculated hydrogen or gases containing free hydrogen. In such cases pressures up to 500 or 750 pounds per square inch may be used and the quantity of hydrogen may be between 500 and 5000 cubic feet per barrel of oil. By adjusting the operating conditions in relation to each other, it is possible to conduct the reaction in the presence of hydrogen in such a manner that there will either be no net consumption of free hydrogen or there will be a net production of hydrogen therein. Thus after once having started up the process it is not necessary thereafter to supply hydrogen from an extraneous source because the hydrogen initially added and that which may be produced in the reforming reaction may be continuously recycled. Operation of the reforming process in the presence of hydrogen has the important effect among others of retarding the rate of deposition of carbonaceous contaminants on the catalyst so that the catalyst may be used for longer periods before it is necessary to regenerate. Processes of catalytic cracking in which catalysts of the type described are used are applied to the treatment of higher boiling hydrocarbon oils such as gas oils for the purpose of converting them into hydrocarbon oils of high octane number boiling in the gasoline range. The process is ordinarily carried out at temperatures between 750 and 850° F. under substantially atmospheric pressure or somewhat thereabove and at space velocities of 0.5 to 1.0 volume of liquid oil per volume of catalyst per hour. As in the case of catalytic reforming the process is advantageously carried out in the presence of substantial quantities of added or recirculated hydrogen or gases containing hydrogen.

Characteristic of these catalytic reactions whether or not carried out in the presence of hydrogen is the fact that the catalyst requires periodic regeneration in order to restore its activity. The length of time the catalyst can be used before it requires regeneration depends on a number of factors, primarily upon the nature of the feed stock, the severity of the operating conditions and the degree of conversion and improvement which it is desired to effect. As indicated above, conducting the reaction in the presence of hydrogen tends to prolong the time the catalyst can be used before requiring regeneration. In general it is found that the length of the reaction portion of a complete cycle of reaction and regeneration may range from about 10 to 60 minutes in the case of catalytic cracking to 3 hours to 12 or 20 hours or more in the case of catalytic reforming. The length of the regeneration portion of a cycle also depends on a number of factors, primarily the quantity of carbonaceous contaminants which has been deposited on the catalyst in the preceding reaction portion of the cycle, the rate at which the carbonaceous contaminants are burned off and the maximum permissible temperature to which the catalyst can be heated without impairing its activity. In general it is desirable to adjust regeneration conditions so that the length of the regeneration portion of a cycle will be substantially the same as the length of the reaction portion of the cycle. It will be understood that the regeneration portion of the cycle represents a direct loss of capacity insofar as producing the desired product is concerned.

The usual method of regenerating catalysts of the type described is to pass inert gases containing regulated small quantities of air or oxygen through the catalyst mass. The temperature at which the inert gases containing oxygen are introduced must be high enough to initiate combustion of the carbonaceous material on the catalyst but must not be so high that the heat generated during the combustion of the carbonaceous material will raise the temperature of any portion of the catalyst mass above about 1200° F. It has been found that temperatures above about 1200° F. have an unfavorable effect on some of these catalysts and may cause permanent damage to their activity. The passage of these gases through the catalyst mass is continued until the carbonaceous material is substantially completely burned off. The point at which this occurs will be indicated by the fact that there ceases to be a consumption of oxygen or the fact that there ceases to be an increase in the temperature of the gases introduced into the catalyst mass.

It has been found from experience that the inlet temperature of the regenerating gases should be between 500 and 700° F., preferably about 600 to 650° F., the oxygen content of said gases should be between about 0.1 and 15%, preferably between 0.5 and 10%, and the space velocity of the gases should be between 500 and 5000 volumes of gas per volume of catalyst per hour. Under conditions selected within these limits the maximum temperature developed in the catalyst mass may be kept below about 1200° F.

It will be seen that as the regeneration proceeds and as the carbonaceous material is burned off of the catalyst, the generation of heat from the combustion will decrease. Hence toward the end of the regeneration the exit temperature of the regeneration gases will approach the inlet temperature of said gases. At the conclusion of the regeneration, a large proportion of the catalyst mass will be at the temperature of the inlet gases or between 500 and 700° F. The temperature at which the reaction portion of the cycle is to be carried out is ordinarily above the temperature at which the regeneration is completed and hence the regenerated catalyst must be reheated to the required reaction temperatures before the reaction portion of the cycle may proceed.

It is a principal object of the present invention to provide a process by which the regeneration may be carried out so that the catalyst at the completion of the regeneration will be at the required temperature for the reaction portion of the cycle, thus avoiding the necessity for reheating the catalyst mass after regeneration.

The nature of the process and the manner in which it is carried out will be fully understood from the following description and the drawing which, for purposes of illustration, relate to a process of catalytic reforming in the presence of hydrogen.

Referring to the drawing, numeral 1 designates a reaction vessel containing a reforming catalyst 2. Numeral 3 designates a line through which feed oil is introduced into the reaction vessel and numeral 4 designates a line through which reaction products are removed therefrom. It will be assumed that the reforming portion of a cycle has been completed and the catalyst 2 in reaction vessel 1 now requires regeneration. Valves 3a in line 3 and 4a in line 4 are closed. The reaction vessel 1 and the catalyst therein are still at the temperature and under the pressure at which the reforming reaction has been carried out.

Valve 5a in line 5 is opened and the pressure in reaction vessel 1 is reduced to atmospheric pressure. Inert gas under a pressure of 300 to 500 pounds per square inch is supplied from tank 6 through line 7 and is introduced into reaction vessel 1 through line 8 by opening valve 7a. The reaction vessel 1 is thus purged with inert gas and the remaining hydrocarbon vapors are thus swept out. Valve 5a in line 5 is now closed and the pressure in reaction vessel 1 is allowed to build up to the pressure at which the regeneration treatment is to be carried out. This will be between 50 and 400 pounds per square inch. Valve 7a is now closed. It will be understood that the purging and regeneration may be carried out under the same pressure as the catalytic reforming.

Numeral 9 designates a supply of an inert gas which may be a flue gas or any other gas which does not contain appreciable quantities of free oxygen. This gas is drawn through line 10 by means of a blower or compressor 11 and forced through line 12. Air is drawn through line 13 by means of compressor 14 and forced through line 15 which meets line 12. A mixture of air and flue gas is formed in which the concentration of oxygen is regulated between about 0.1 and 15%. The mixture of flue gas and air flows through a heating means 16 wherein it is heated to a temperature between 500 and 700° F. The heated mixture flows through line 17 and is introduced into reaction vessel 1 through line 8 by opening valve 17a.

The hot mixture of flue gas and air on coming in contact with catalyst 2 in reaction vessel 1 causes combustion of the carbonaceous material on the catalyst. The combustion gases are removed from reaction vessel 1 through lines 5 and 18 by opening valve 18a. The heat generated by the combustion of the carbonaceous material raises the temperature of the combustion gases so that at the exit the temperature will be between 1050 and 1100° F. If the temperature tends to rise above this point, it may be reduced either by increasing the rate at which the flue gas and air mixture is passed through the reaction vessel or by decreasing the percent of air in the mixture. Inasmuch as the removal of carbonaceous material is the purpose of the regeneration and inasmuch as this carbonaceous material is only removed by combustion, it can be seen that by reducing the percent oxygen in the mixture of gases the time it will take to remove the carbonaceous material will only be prolonged. Hence it is preferable to maintain the concentration of air in the gas mixture constant and to control the temperature by increasing or decreasing the rate at which the mixture of gases is passed through the reaction zone. This rate may be regulated between about 500 and 5000 volumes of gas mixture per volume of catalyst per hour.

It is of course desirable to complete the regeneration of the catalyst in the shortest possible time. The important limiting factor is that the maximum temperature in the catalyst mass should not be allowed to rise above about 1200° F. or whatever other temperature may be found to have an injurious effect on the catalyst. With this limitation in mind there must be a balance between the inlet temperature of the gas mixture, the quantity of the gas mixture and the percent oxygen in this mixture. Conducting the regeneration under pressure has a favorable effect because it reduces the volume of the quantity of the gas mixture which is required and thus for a given volume has a greater heat absorbing capacity. It also permits the use of lines and blowers of greatly reduced size.

Near the end of the regeneration period a portion of the flue gas and air mixture flowing through line 17 is by-passed through line 19 and heating means 20 and then re-united with the main stream of the mixture before it enters reaction vessel 1. The portion of the gas mixture by-passed through heating means 20 is heated to a higher temperature than the main stream of gas mixture, say to 800 or 1200° F. so that the inlet temperature of the gas is increased from 500 to 700° F. to a somewhat higher temperature. The portion of the gas mixture by-passed through line 19 and heating means 20 is gradually increased so that finally when the regeneration is completed the inlet temperature of the gas mixture entering the reaction vessel is substantially the temperature at which the catalyst mass should be maintained for the ensuing reforming portion of the cycle. The outlet temperature of the gas will be substantially the same as the inlet temperature so that the catalyst temperature will be uniform. In this way no time is lost in reheating the catalyst from the final regeneration temperature to the required reforming temperature. Instead of by-passing a portion of the gas mixture through a separate heater 19 it will be understood that the temperature of the entire gas stream can be raised in heater 16 if desired.

When the regeneration is complete, valves 17a and 18a are closed and valve 5a is opened so that the pressure in the reaction vessel is reduced to atmospheric. This is done to expel the regeneration gases and to remove any traces of free oxygen which may remain in the reaction vessel. Following this, valve 7a is opened and inert gas from tank 6 is allowed to flow through the reaction vessel to sweep out the last traces of the regeneration gases. (Recycle gases supplied through a line 22 may be used for this purpose instead of inert gas.) Thereafter valve 5a is closed and pressure is allowed to build up in reaction vessel to that required for the reforming portion of the cycle. Finally, valve 7a is closed, valves 3a, 3b and 4a are opened and the flow of feed oil is resumed through the reaction vessel.

In the event that the reforming reaction is conducted in the presence of added or recirculated hydrogen it may be desirable before finally bringing the reaction vessel up to reforming pressure to purge it with the hydrogen containing gases which are to be recirculated. For this purpose recycle gas may be supplied through line 22 and forced by compressor 23 through lines 24 and 3 into reaction vessel 1. Valves 3b and 21a will be opened and recycle gas will sweep out the reaction vessel. Then valve 21a will be closed and pressure allowed to build up to the required reforming pressure. When this pressure is reached, valves 3a and 4a will be opened and the flow of oil and hydrogen resumed.

In carrying out the above described method of regeneration, the exact point at which the inlet temperature of the regeneration gases may first be increased by by-passing a portion of the flue gas-air mixture through heating means 20 cannot be fixed at a definite time because it will depend upon a number of factors. However, it can readily be determined for a particular catalyst, coke content, space velocity of flue gas-air mixture and oxygen concentration in the mixture by experience in operation. Whether or not the time has been reached when the inlet temperature can be increased and the extent to which it may be increased is determined by whether or not such an increase will result in raising the temperature in any portion of the catalyst mass above the permitted maximum. For example, if an increase in inlet temperature from 600° F. to 650° F. shows indications of causing a temperature above about 1200° F. at any point in the catalyst mass the operator will know that it is too soon to start raising the inlet temperature and will delay the temperature increase until later in the regeneration period. After having carried out a number of regenerations, the operator will soon be able to predict at about what stage of the regeneration it is safe to start raising the inlet temperature. Thereafter until the end of the regeneration the inlet temperature may be progressively increased until it is substantially equal to the temperature at which the reforming portion of the cycle is to be carried out.

In the above description it has been indicated that depressuring and purging of the reaction vessel are effected before and after regeneration. These steps may not be necessary in all cases particularly when the reforming reaction is not conducted in the presence of hydrogen. However, they are preferable when the reforming is conducted in the presence of hydrogen in order to avoid any possibility of mixtures of hydrogen and oxygen being present in the apparatus. It will be understood that purging may be effected without first reducing the pressure.

In the description and drawing the regeneration gases after leaving the reaction vessel are discarded and a continuous supply of flue gas is shown to be necessary. It should be understood, however, that after having started up with a supply of flue gas the combustion of the carbonaceous matter supplies additional gas of this type and these combustion gases together with the gas initially added may be continuously recirculated. Thus a continuous supply of flue gas from an extraneous source is not necessary. When the regeneration gases are recirculated it will be understood that cooling means must be provided to cool them down from the exit temperature of around 1000° F. to the required inlet temperature of 600 to 700° F. Thus the flue gases withdrawn through line 18 may be passed by line 25 through cooler 26 thence recycled to reactor 1 through line 27 and 8. In such cases a portion of the gases may be by-passed through line 29 around the cooling means 26 when it is desired to increase the inlet temperature.

Although the above description of the improved method of regeneration has been made with reference to a catalytic reforming operation, it will be understood that the method is equally applicable to other catalytic reactions in which catalysts are used which lose their activity due to the deposition of carbonaceous contaminants, and are capable of being regenerated by the combustion of said carbonaceous contaminants at temperatures below the temperatures at which the catalytic reactions are carried out.

I claim:

1. In the regeneration of a catalyst which has lost its activity by use in a catalytic reaction by passage through said catalyst of oxygen-containing gases in the same direction as the combustion progresses therethrough, the improvement which comprises progressively increasing the temperature of the gas mixture used to bring about combustion near the end of the regeneration period until the inlet temperature of said gas mixture is substantially the same as the temperature at which the regenerated catalyst is to be used for further reaction.

2. In the regeneration of a catalyst which has lost its activity by use in a catalytic reaction by the passage through said catalyst of hot regeneration gas mixture in the same direction as the combustion progresses therethrough, the improvement which comprises progressively increasing the inlet temperature of the regenerating gas mixture near the end of the regeneration period until said inlet temperature is substantially equal to the temperature at which the regenerated catalyst is to be used for further reaction.

3. An improved method for regenerating the activity of a catalyst which has lost its activity by use in a catalytic reaction which comprises heating a regeneration gas mixture to a temperature between about 500 and 700° F., passing said heated gas mixture through the catalyst mass in quantities sufficient to prevent the temperature of the catalyst mass from rising above about 1200° F. and in the same direction as the combustion progress therethrough, maintaining the inlet temperature of the gas mixture substantially within these limits until near the end of the regeneration period, and then progressively increasing the inlet temperature of the gas mixture until, at the end of the regeneration period, the inlet temperature is substantially equal to the temperature at which the regenerated catalyst is to be used for further reactions.

4. An improved method for regenerating the activity of a catalyst which has been used in a catalytic reaction which comprises heating a regeneration gas mixture to a temperature between 500 and 700° F., passing the heated gas mixture through the catalyst in the same direction as the combustion progresses therethrough at a velocity between 500 and 5000 volumes of gas per volume of catalyst per hour, maintaining the inlet temperature of the gas mixture between these limits until near the end of the regeneration period, then progressively increasing the inlet temperature of the gas mixture until at the end of the regeneration period it is substantially equal to the temperature at which the regenerated catalyst is to be used for further reaction but controlling the inlet temperature so that the maximum temperature at any portion of the catalyst mass will not exceed about 1200° F.

5. An improved method for regenerating the activity of a catalyst which has been used in a catalytic reaction of the type of catalytic cracking and catalytic reforming until its activity has been substantially reduced which comprises heating a regeneration gas mixture to a temperature between 500 and 700° F., continuously passing a stream of the heated gas mixture through the catalyst mass in the same direction as combustion progresses therethrough to cause combustion of the carbonaceous contaminants deposited upon the catalyst during the reaction, by-passing a portion of the stream of heated gas mixture near the end of the regeneration period through a heating means to raise its temperature substantially above 500 to 700° F., mixing this by-passed portion of the stream with the main body of the stream before it passes through the catalyst mass whereby the inlet temperature of the gas mixture is raised above the initial temperature of 500 to 700° F., adjusting the proportion of the stream so by-passed and the temperature to which it is heated so that the maximum temperature developed in any portion of the catalyst mass will not exceed about 1200° F., and gradually increasing the proportion of the stream so by-passed and the temperature to which it is heated so that at the end of the regeneration period the inlet temperature of the entire stream of gas mixture will be substantially equal to that at which the regenerated catalyst is to be used for further reaction.

6. Method according to claim 8 in which the gas mixture comprises flue gas and from 0.1 to 5% of oxygen and is passed through the catalyst mass at a rate of 500 to 5000 volumes of gas mixture per volume of catalyst per hour.

7. Method according to claim 8 in which the catalyst mass is maintained under a pressure between 50 and 400 pounds per square inch during the regeneration period.

8. An improved method for regenerating the activity of a catalyst which has been used for catalytic reforming until its activity has been substantially reduced which comprises heating a regeneration gas mixture to a temperature between 500 and 700° F., passing this heated gas mixture through the catalyst mass in the same direction as the combustion progresses therethrough to cause combustion of the carbonaceous contaminants which were deposited upon the catalyst during the reforming operation, adjusting the rate at which the gas mixture is passed through the catalyst mass so that the maximum temperature developed in any portion of the catalyst mass will not exceed about 1200° F., removing the gases after passing through the catalyst mass, cooling said gases to a temperature between about 500 and 700° F., adding a small amount of air thereto, again passing this gas mixture through the catalyst mass to cause combustion of further amounts of coke near the end of the regeneration, increasing the inlet temperature of the gas-air mixture to the catalyst by removing less heat from the combustion gases, and progressively increasing the inlet temperature of the gas-air mixture in this manner so that the said inlet temperature at the end of the regeneration period will be substantially equal to the temperature at which the regenerated catalyst is to be used for further reforming.

ALBERT B. WELTY, JR.